(12) United States Patent
Hernandez Vazquez

(10) Patent No.: US 9,706,281 B2
(45) Date of Patent: Jul. 11, 2017

(54) HEADSET WITH ADJUSTABLE MICROPHONE BOOM

(71) Applicant: Plantronics, Inc., Santa Cruz, CA (US)

(72) Inventor: Gerardo Hernandez Vazquez, Tijuana (MX)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 14/820,906

(22) Filed: Aug. 7, 2015

(65) Prior Publication Data

US 2017/0041695 A1 Feb. 9, 2017

(51) Int. Cl.
*H04R 25/00* (2006.01)
*H04R 1/08* (2006.01)
*H04R 1/10* (2006.01)
*F16M 13/04* (2006.01)

(52) U.S. Cl.
CPC ............. *H04R 1/08* (2013.01); *F16M 13/04* (2013.01); *H04R 1/105* (2013.01); *H04R 2201/107* (2013.01)

(58) Field of Classification Search
CPC ............. H04M 1/6058; H04R 1/083; H04R 2201/107; H04R 1/1058; H04R 1/1066; H04R 5/033; H04R 1/08; H04R 1/105; F16M 13/04

USPC ....... 381/370, 371, 375, 374, 367, 362, 361; 379/430
See application file for complete search history.

(56) References Cited

U.S. PATENT DOCUMENTS

| 7,391,863 | B2 * | 6/2008 | Viduya | H04M 1/05 379/430 |
| 7,885,419 | B2 * | 2/2011 | Wahl | H04M 1/05 381/370 |
| 2001/0017925 | A1 * | 8/2001 | Ceravolo | H04M 1/05 381/370 |
| 2001/0036291 | A1 * | 11/2001 | Pallai | H04R 1/083 381/382 |
| 2007/0004236 | A1 * | 1/2007 | Suenaga | H01R 35/04 439/15 |

* cited by examiner

*Primary Examiner* — Davetta W Goins
*Assistant Examiner* — Phylesha Dabney
(74) *Attorney, Agent, or Firm* — Chuang Intellectual Property Law

(57) ABSTRACT

In one example of the invention, an apparatus includes a housing, a first shoe contacting a surface of the housing, and a second shoe contacting the surface of the housing. The apparatus includes a spring having a first spring end contacting the first shoe and a second spring end contacting the second shoe. The apparatus includes a microphone boom rotatable with respect to the housing.

18 Claims, 5 Drawing Sheets ns a microphone boom
HEADSET WITH ADJUSTABLE MICROPHONE BOOM

BACKGROUND OF THE INVENTION

Communications headsets are used in a wide range of applications. A microphone boom is often used to place an acoustic sensing point near the user's mouth. In some designs, the microphone boom is adjustable so the user can position the acoustic sensing point as desired. However, conventional adjustable microphone booms capable of providing a consistent, reliable, and controlled torque are difficult to manufacture, as precise sizing and assembly of the device components are required. As a result, there is a need for improved methods and apparatuses for adjustable microphone booms.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
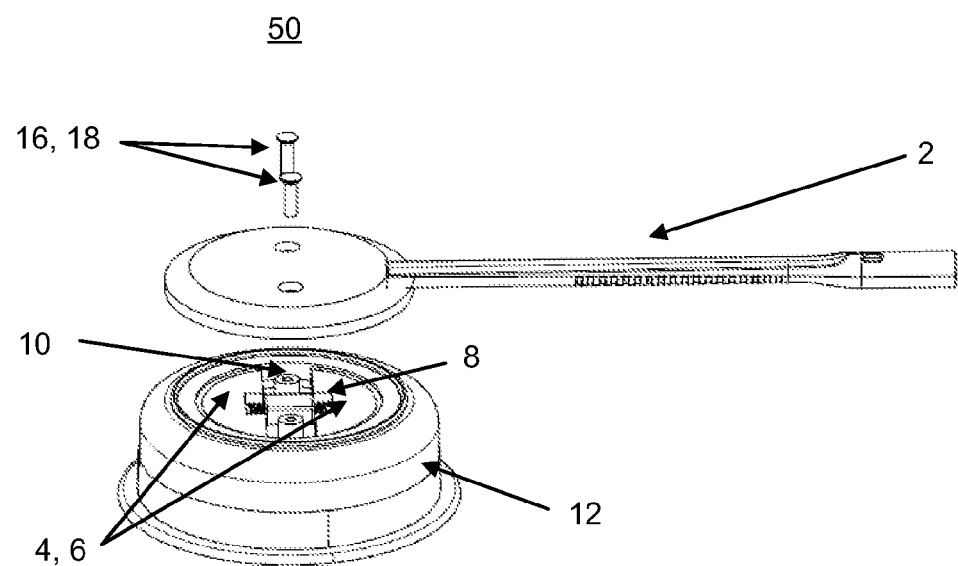
FIG. 1 illustrates a microphone boom assembly in one example.

Methods and apparatuses for adjustable microphone booms are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In one example of the invention, an apparatus includes a housing, a first shoe contacting a surface of the housing, and a second shoe contacting the surface of the housing. The apparatus includes a spring having a first spring end contacting the first shoe and a second spring end contacting the second shoe. The apparatus includes a microphone boom rotatable with respect to the housing.

In one example, an apparatus includes a housing, a first shoe in movable contact with a surface of the housing, and a second shoe in movable contact with the surface of the housing. The apparatus includes a spring comprising a first spring end contacting the first shoe and a second spring end contacting the second shoe, wherein the spring is arranged to provide a spring force against the first shoe and the second shoe. The apparatus further includes a microphone boom arranged to rotate with respect to the housing by moving the first shoe and the second shoe along the surface of the housing.

In one example, a head-worn device includes a housing, a microphone boom, and a spring. The head-worn device includes a friction element (e.g., a shoe) disposed between the spring and a surface of the housing, the friction element receiving a spring force and arranged to provide an opposition force to movement of the microphone boom with respect to the housing.

In one example, a headset is provided having a torque controlled microphone boom attached to a capsule body. In one example, the headset includes a capsule body, a spring holder, a spring, a pair of brake shoes, a microphone boom, and screws. In operation, the spring provides a desired spring force. The spring force is always constant if it is used in its lineal region; as such, the spring is arranged to maintain a constant force applied to the pair of brake shoes causing them to be pressing against the body of the capsule in a uniform way. In one example, the brake shoes are composed of a rigid section plus an over-molded area. Advantageously, the torque obtained can be selected using the appropriate spring force constant K, allowing flexibility to adjust the torque easily. Advantageously, the design of the microphone boom assembly provides an adjustable microphone boom more reliably manufactured as it does not rely on precise manufacturing tolerances (e.g., precise size and fit of components), precise assembly processes, or advanced expertise of the manufacturer.

Figure 2:
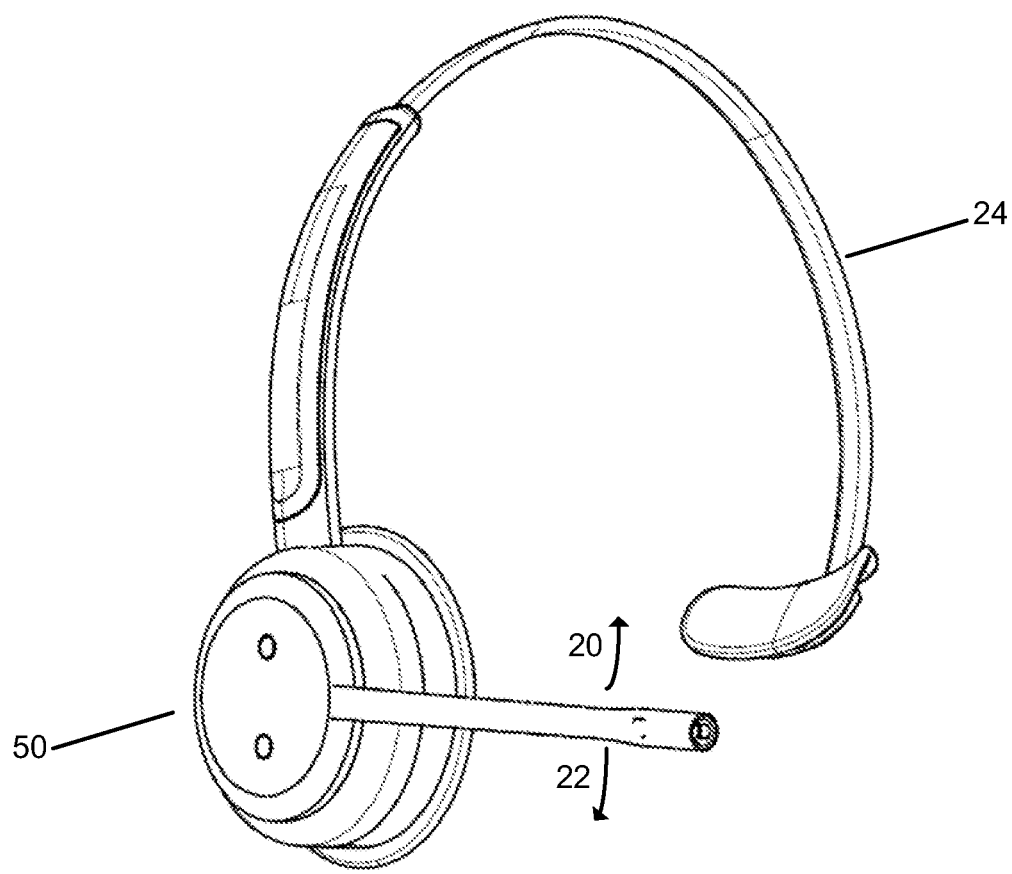
FIG. 2 illustrates a headset utilizing the microphone boom assembly shown in FIG. 1 in one example.
Figure 3:
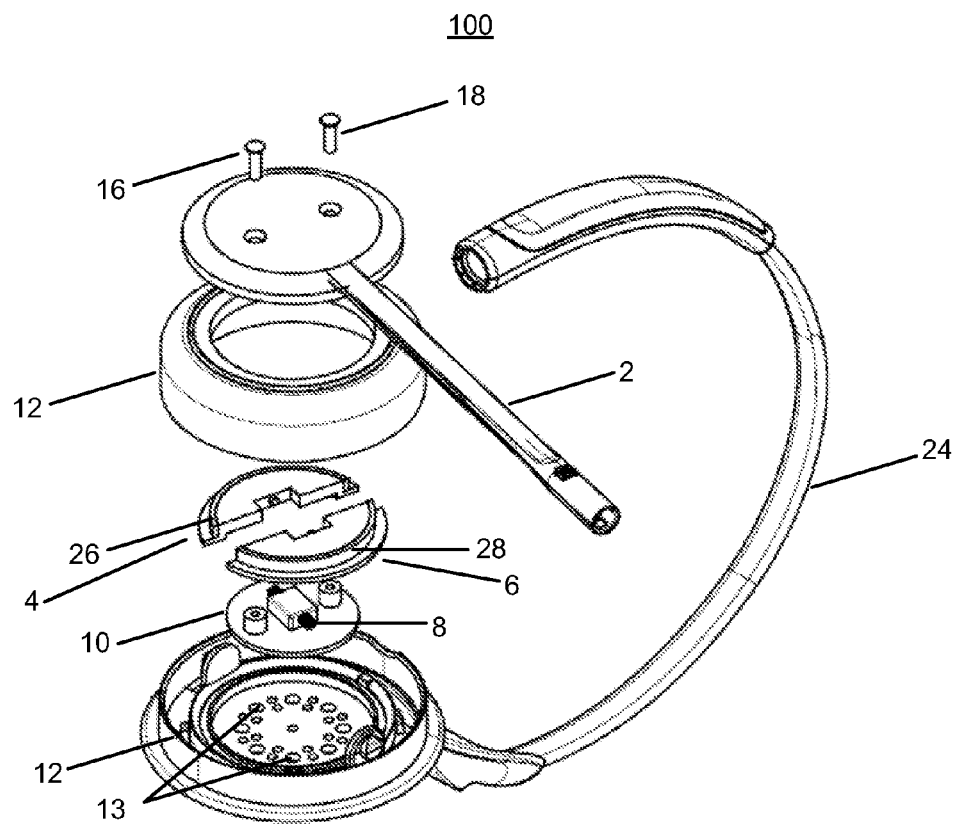
FIG. 3 is an exploded view of the headset shown in FIG. 2.

FIG. 1 illustrates a microphone boom assembly 50 in one example. FIG. 2 illustrates a headset 100 utilizing the microphone boom assembly 50 shown in FIG. 1 in one example. FIG. 3 is an exploded view of the headset 100, and in particular the microphone boom assembly 50.

Referring to FIG. 2, headset 100 includes a headband 24 attached to microphone boom assembly 50 so that headset 100 can be worn by a user in a stable position. Headband 24 is adjustable to fit a variety of head sizes without affecting the comfort and stability of the headset 100. In further examples, an alternative support member in place of headband 24 may be utilized to affix the headset to the wearer.

The headset 100 includes a housing having a microphone boom 2 mounted in a manner to permit rotational movement of the microphone boom 2. In one example, the housing includes a microphone boom assembly 50. Referring to FIG. 2, microphone boom 2 is rotatable in direction 20 or direction 22 as desired by the wearer to position the microphone boom 2. Specifically, by placing a torque on the microphone boom 2, it can be rotated in either direction 20 or direction 22.

Referring to FIG. 1 and FIG. 3 together, microphone boom assembly 50 includes a capsule body 12, a first shoe 4 contacting an inner surface of the capsule body 12, and a second shoe 6 contacting the inner surface of the capsule body 12. The microphone boom assembly 50 includes a spring 8 having a first spring end contacting the first shoe 4 and a second spring end contacting the second shoe 6. A spring holder 10 is arranged to position the spring 8 between the first shoe 4 and the second shoe 6. The microphone boom assembly 50 includes a microphone boom 2 rotatable with respect to the capsule body 12.

In one embodiment, first shoe 4 and second shoe 6 are semi-circular discs which rest on disc-shaped spring holder 10. Spring holder 10 includes a pair of screw hole columns (for receiving screw 16 and screw 18) rising from the planar surface of the disc. Spring holder 10 includes and a tubular channel for receiving spring 8 to position spring 8 between first shoe 4 and second shoe 6 when first shoe 4 and second shoe 6 are placed upon spring holder 10 during assembly. The outer circumference of first shoe 4 and second shoe 6 are matched to the circumference of an inner surface of capsule body 12.

First shoe 4 is in movable contact with an inner surface of the capsule body 12 (or a surface of a housing non-movably affixed within the capsule body 12), and second shoe 6 is in movable contact with the inner surface of the capsule body 12 (or the surface of a housing non-movably affixed within the capsule body 12). First shoe 4, second shoe 6, and spring 8 are disposed within capsule body 12. Microphone boom 2 is arranged to rotate with respect to the capsule body 12 by moving the first shoe 4 and the second shoe 6 along the inner surface of the capsule body 12. The microphone boom 2 is coupled to the spring holder 10 utilizing screw 16 and screw 18, where the spring holder 10, the spring 8, the first shoe 4, and the second shoe 6 are arranged to rotate with respect to the capsule body 12 in unison with the microphone boom 2.

First shoe 4 and second shoe 6 retard and control the motion of microphone boom 2 by providing a friction resistance with the inner surface of the capsule body 12, whereby the friction resistance can be overcome when the user moves first shoe 4 and second shoe 6 over the inner surface of the capsule body by rotating the microphone boom 2. First shoe 4 and second shoe 6 operate as a brake to the motion of the microphone boom 2, preventing any motion and keeping the microphone boom 2 stationary when the user is not attempting to adjust it.

Figure 4:
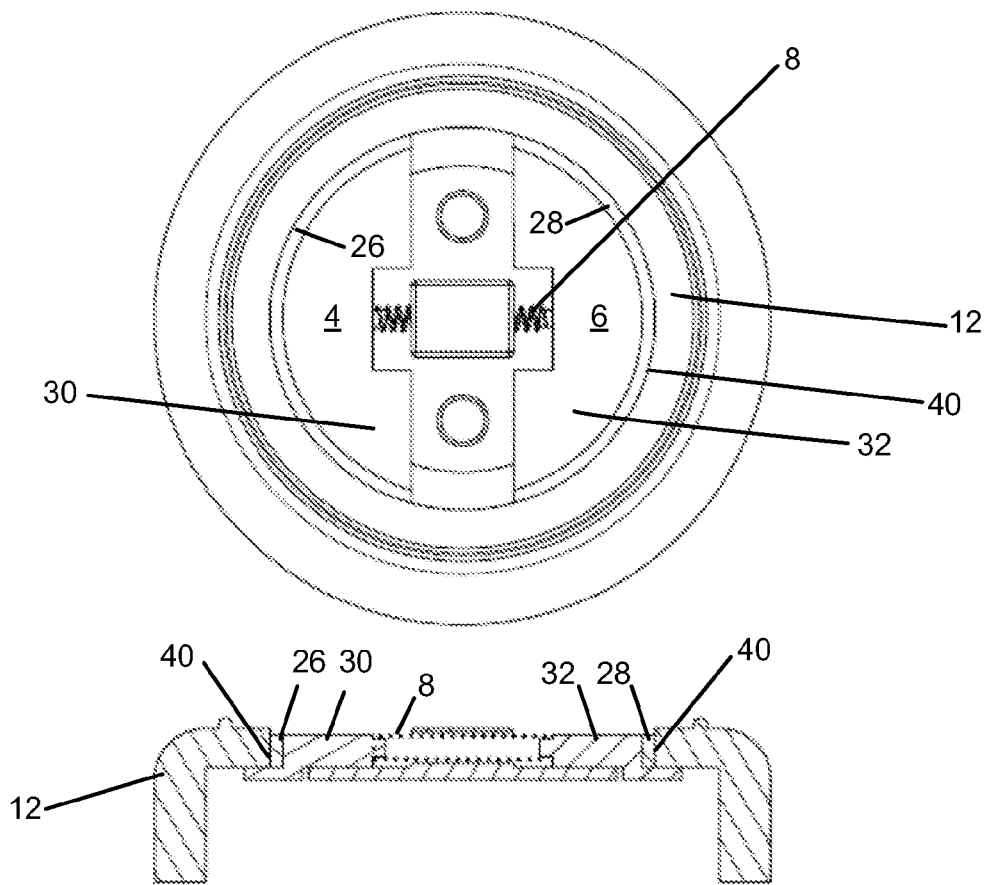
FIG. 4 illustrates a top view and a cross-sectional view of components of the microphone boom assembly in one example.
Figure 5:
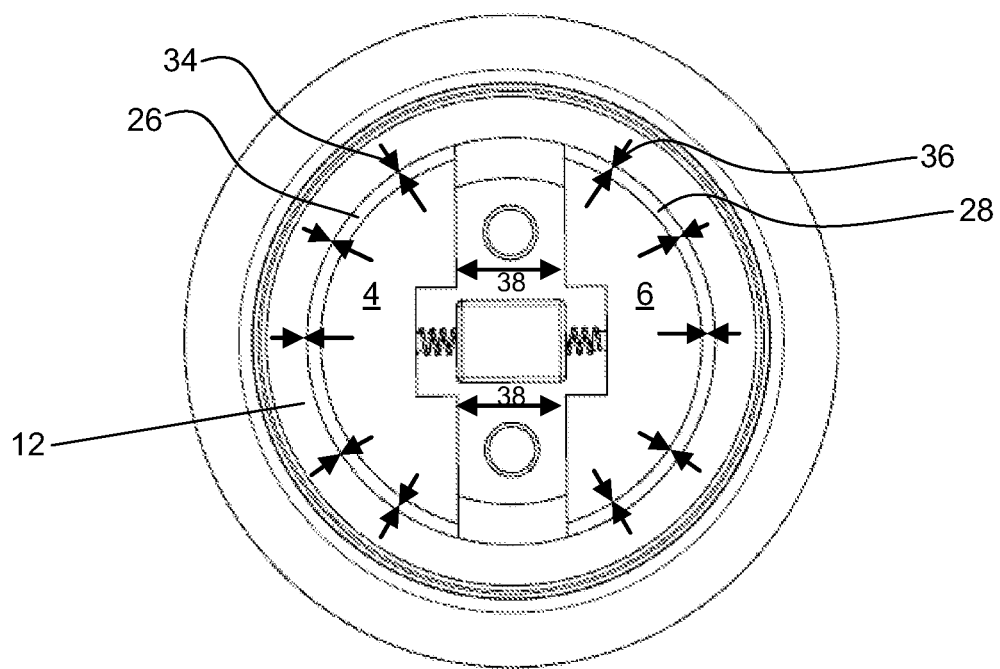
FIG. 5 illustrates operation of the microphone boom assembly in one example.

FIG. 4 illustrates a top view and a cross-sectional view of components of the microphone boom assembly 50 in one example. FIG. 5 illustrates operation of the microphone boom assembly 50 in one example. Referring to FIG. 4 and FIG. 5 together, first shoe 4 includes a first plastic material 30 and a first rubber material 26 and the second shoe 6 includes a second plastic material 32 and a second rubber material 28. First rubber material 26 contacts an inner surface 40 of the capsule body 12 and second rubber material 28 contacts the inner surface 40 of the capsule body 12. The spring force 38 against the first shoe 4 and the second shoe 6 results in a first friction 34 between the first shoe 4 and the inner surface 40 of the capsule body 12 and a second friction 36 between the second shoe 6 and the inner surface 40 of the capsule body 12. First shoe 4 encounters first friction 34 when moving along inner surface 40, the movement caused by the user rotating microphone boom 2 (i.e., applying a torque to the microphone boom 2). Similarly, second shoe 6 encounters second friction 36 when moving along inner surface 40, the movement caused by the user rotating microphone boom 2. Spring force 38 may be controlled by varying the spring constant K of spring 8.

In one example embodiment, the headset 100 with the microphone boom assembly 50 does not require precisely sized foam washers or plastic O-rings to reliably and consistently control the boom torque. Instead, spring force 38 from spring 8 reliably and consistently controls the boom torque.

Capsule body 12 is generally a cylindrical housing having a receiver unit including a transducer (i.e., a speaker) disposed within it for converting electrical signals into sound waves audible to the user. In one embodiment, the cylindrical housing may be formed from multiple housing components which are secured together. The receiver unit is worn on the user ear to output sound from the transducer directly into the user ear. The receiver unit may fit within the capsule body 12 utilizing a mounting ring or some other form of securement mechanism. In order to permit the sound waves emitted from the receiver unit to travel directly to the wearer's ear, one end of the capsule body 12 is provided with multiple apertures 13 (as shown in FIG. 3) operating as sound ports to enable audible sound waves to travel from the receiver transducer and into the wearer's ear. The capsule body 12 housing includes a lower cover having a series of apertures to port sound output from the receiver unit. An ear cushion may be placed over the cover to provide user comfort when worn on the user ear. In one example, the ear cushion is formed from a polyurethane compressible foam.

The capsule body 12 defines a cavity for mounting the components described herein. Capsule body 12 may be formed from a high impact plastic, and is generally cylindrical in configuration, having dimensions sufficient to contain the receiver transducer as well as shoe 4, shoe 6, spring 8, and spring holder 10. Once these components are mounted within the cavity of capsule body 12, the various housing components of capsule body 12 are attached to each other. In one example a capsule lower body and a capsule upper body snap-fit together and/or an adhesive may be utilized. The main body includes a circular aperture in a top portion providing access to screw holder 10 within, allowing microphone boom 2 to be attached utilizing screw 16 and screw 18. The circular aperture has a radius less than the overall radius of the capsule.

The microphone boom 2 is mounted to the capsule body 12 to facilitate adjustment. In this example, microphone boom includes a portion arranged to serve as a top cover for capsule body 12 when attached to spring holder 10. The microphone boom 2 is formed with a generally circular cross-section. As previously described, microphone boom 2 may be adjusted rotationally relative to the capsule body 12 in at least one axis when desired, yet remains stable otherwise, allowing the user to position the microphone boom 2 at an optimum position for receiving the user's voice. Headset 100 includes a microphone to receive user speech which may be placed at the distal end of the microphone boom 2. Alternatively, the microphone may be placed within the capsule body 12 worn on the user ear, whereby sound is transported to the microphone by way of a hollow microphone boom 2. In example, the microphone is an electret condenser microphone capable of converting sound waves into electrical signals.

While the exemplary embodiments of the present invention are described and illustrated herein, it will be appreciated that they are merely illustrative and that modifications can be made to these embodiments without departing from the spirit and scope of the invention. For example, methods, techniques, and apparatuses described as applying to one embodiment or example may also be utilized with other embodiments or examples described herein. Thus, the scope of the invention is intended to be defined only in terms of the following claims as may be amended, with each claim being expressly incorporated into this Description of Specific Embodiments as an embodiment of the invention.

What is claimed is:

1. An apparatus comprising:
    a housing;
    a first shoe contacting a surface of the housing;
    a second shoe contacting the surface of the housing;
    a spring comprising a first spring end contacting the first shoe and a second spring end contacting the second shoe;
    a microphone boom rotatable with respect to the housing; and a spring holder apparatus arranged to position the spring between the first shoe and the second shoe, wherein the microphone boom is coupled to the spring holder apparatus, and wherein the spring holder apparatus, the spring, the first shoe, and the second shoe are arranged to rotate with respect to the housing in unison with the microphone boom.

2. The apparatus of claim 1, wherein the microphone boom is arranged to move the first shoe and the second shoe along the surface of the housing.

3. The apparatus of claim 1, wherein the housing comprises a capsule and the first shoe, the second shoe, and the spring are disposed within the capsule.

4. The apparatus of claim 1, wherein the first shoe comprises a first rubber material contacting the surface of the housing and the second shoe comprises a second rubber material contacting the surface of the housing.

5. The apparatus of claim 1, wherein the spring exerts a spring force against the first shoe and the second shoe, resulting in a first friction between the first shoe and the surface of the housing and a second friction between the second shoe and the surface of the housing.

6. The apparatus of claim 1, wherein the first shoe comprises a first plastic material and a first rubber material and the second shoe comprises a second plastic material and a second rubber material.

7. An apparatus comprising:
a housing;
a first shoe in movable contact with a surface of the housing;
a second shoe in movable contact with the surface of the housing;
a spring comprising a first spring end contacting the first shoe and a second spring end contacting the second shoe, wherein the spring is arranged to provide a spring force against the first shoe and the second shoe; and
a microphone boom arranged to rotate with respect to the housing by moving the first shoe and the second shoe along the surface of the housing.

8. The apparatus of claim 7, wherein the housing comprises a capsule and the first shoe, the second shoe, and the spring are disposed within the capsule.

9. The apparatus of claim 7, wherein the first shoe comprises a first rubber material contacting the surface of the housing and the second shoe comprises a second rubber material contacting the surface of the housing.

10. The apparatus of claim 7, wherein the spring force against the first shoe and the second shoe results in a first friction between the first shoe and the surface of the housing and a second friction between the second shoe and the surface of the housing.

11. The apparatus of claim 7, further comprising a spring holder apparatus arranged to position the spring between the first shoe and the second shoe.

12. The apparatus of claim 11, wherein the microphone boom is coupled to the spring holder apparatus, wherein the spring holder apparatus, the spring, the first shoe, and the second shoe are arranged to rotate with respect to the housing in unison with the microphone boom.

13. The apparatus of claim 7, wherein the first shoe comprises a first plastic material and a first rubber material and the second shoe comprises a second plastic material and a second rubber material.

14. A head-worn device comprising:
a housing;
a microphone boom;
a spring holder;
a spring; and
a friction element disposed between the spring and a surface of the housing, the friction element receiving a spring force and arranged to provide an opposition force to movement of the microphone boom with respect to the housing, wherein the friction element, the spring holder, and the spring are arranged to rotate with respect to the housing in unison with the microphone boom.

15. The head-worn device of claim 14, wherein the housing comprises a capsule and the friction element and the spring are disposed within the capsule.

16. The head-worn device of claim 14, wherein the friction element comprises a rubber material contacting the surface of the housing.

17. The head-worn device of claim 14, wherein the friction element comprises a plastic material and a rubber material.

18. The head-worn device of claim 14, wherein the head-worn device further comprises a microphone and a speaker.

* * * * *